(12) United States Patent
Holmes et al.

(10) Patent No.: US 7,517,933 B2
(45) Date of Patent: *Apr. 14, 2009

(54) FLEXIBLE BAKEWARE

(75) Inventors: Jeannie Holmes, Weatherford, TX (US); Samuel W. Heath, Jr., Asheboro, NC (US)

(73) Assignee: JAMAK Fabrication-Tex, LLC, Weatherford, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/810,369

(22) Filed: Jun. 5, 2007

(65) Prior Publication Data

US 2008/0015281 A1 Jan. 17, 2008

Related U.S. Application Data

(63) Continuation of application No. 10/685,052, filed on Oct. 14, 2003, now Pat. No. 7,282,532.

(60) Provisional application No. 60/476,325, filed on Jun. 6, 2003.

(51) Int. Cl.
*C08L 83/07* (2006.01)
(52) U.S. Cl. .................. 524/588; 525/479; 528/15; 528/31; 528/32
(58) Field of Classification Search ............... 524/588; 525/479; 528/15, 31, 32
See application file for complete search history.

(56) References Cited

U.S. PATENT DOCUMENTS

| 776,777 A | 12/1904 | Dietz |
|---|---|---|
| 1,965,647 A | 7/1934 | Jackson |
| 2,182,454 A | 12/1939 | Sherman |
| 2,506,928 A | 5/1950 | Klingbiel |
| 2,774,509 A | 12/1956 | Knobloch |
| 3,296,153 A | 1/1967 | Snogren |
| 3,419,593 A | 12/1968 | Willing |
| 3,475,332 A | 10/1969 | Leeper et al. |
| 3,638,583 A | 2/1972 | Goodier et al. |
| 3,715,047 A | 2/1973 | Sado |
| 3,715,329 A | 2/1973 | Glaister |
| 3,814,731 A | 6/1974 | Nitzche et al. |
| 3,900,617 A | 8/1975 | Genoble |
| 3,919,161 A | 11/1975 | Glaister |
| 3,972,850 A | 8/1976 | Hamilton et al. |
| 3,984,022 A | 10/1976 | Babiol |
| 4,002,773 A | 1/1977 | Entenmann |
| 4,028,339 A | 6/1977 | Merrill |
| 4,031,059 A | 6/1977 | Strauss |
| 4,042,543 A | 8/1977 | Strickman et al. |
| 4,076,207 A | 2/1978 | Austin |
| 4,183,998 A | 1/1980 | Vassilou |
| 4,200,658 A | 4/1980 | Katzman et al. |
| 4,216,241 A | 8/1980 | Thompson |
| 4,223,069 A | 9/1980 | Berghmans |
| 4,363,849 A | 12/1982 | Paisley et al. |
| 4,452,859 A | 6/1984 | Nishijima et al. |
| 4,459,247 A | 7/1984 | Rothemund |
| 4,463,029 A | 7/1984 | Nishijima et al. |
| 4,473,919 A | 10/1984 | Fritz, Jr. |
| 4,477,517 A | 10/1984 | Rummel |
| 4,529,741 A | 7/1985 | Bauman et al. |
| 4,585,705 A | 4/1986 | Broderick et al. |
| 4,585,848 A | 4/1986 | Evans et al. |
| 4,623,565 A | 11/1986 | Huybrechts et al. |
| 4,647,641 A | 3/1987 | Westbrook |
| 4,731,517 A | 3/1988 | Cheney |
| 4,812,115 A | 3/1989 | Kemp |
| 4,826,029 A | 5/1989 | Skoglie |
| 4,852,204 A | 8/1989 | Wilson |
| 4,895,766 A | 1/1990 | Saad |
| 4,923,755 A | 5/1990 | Witucki |
| 4,929,460 A | 5/1990 | Lagarde et al. |
| 4,981,637 A | 1/1991 | Hyer |
| 4,986,432 A | 1/1991 | Anghileri |
| 5,071,695 A | 12/1991 | Tannenbaum |
| 5,107,563 A | 4/1992 | Zimmerman et al. |

(Continued)

FOREIGN PATENT DOCUMENTS

AU 659437 8/1992

(Continued)

OTHER PUBLICATIONS

Partial International Search dated May 26, 2006.

(Continued)

*Primary Examiner*—Kuo-Liang Peng
(74) *Attorney, Agent, or Firm*—Sonnenschein Nath & Rosenthal LLC

(57) ABSTRACT

A flexible bakeware compound includes an addition-cured silicone polymer with approximately 0.1 to 15 weight percent of polytetrafluoroethylene. More specifically, the compound preferably includes a methyl vinyl silicone polymer from about 40 to 70 weight percent, a filler from about 5 to 50 weight percent, chloro platanic acid from about 0.1 to 5 weight percent, and polytetrafluoroethylene in an amount of about 6 weight percent. A flexible bakeware container is also provided that includes a receiving channel in a shoulder of the baking container. A carrier is received by the receiving channel to add rigidity to the shoulder, thereby enabling a user to more easily carry the flexible baking container.

15 Claims, 9 Drawing Sheets

U.S. PATENT DOCUMENTS

| | | | |
|---|---|---|---|
| 5,162,397 A | 11/1992 | Descamps et al. | |
| 5,206,329 A | 4/1993 | Sumpter et al. | |
| 5,217,631 A | 6/1993 | Anghileri | |
| 5,232,959 A | 8/1993 | Togashi et al. | |
| 5,246,982 A | 9/1993 | Inoue et al. | |
| 5,252,685 A | 10/1993 | Arai et al. | |
| 5,283,927 A | 2/1994 | Gibbon et al. | |
| 5,317,047 A | 5/1994 | Sabate et al. | |
| 5,349,718 A | 9/1994 | Gibbon | |
| D356,716 S | 3/1995 | Dornbush et al. | |
| 5,400,128 A | 3/1995 | Michlin | |
| 5,400,698 A | 3/1995 | Savage | |
| 5,428,097 A * | 6/1995 | Kobayashi | 524/493 |
| 5,478,605 A | 12/1995 | Ichise | |
| 5,480,915 A | 1/1996 | Burns | |
| 5,491,869 A | 2/1996 | Sullivan et al. | |
| 5,496,862 A | 3/1996 | Burns | |
| 5,521,245 A | 5/1996 | Hirabayashi et al. | |
| 5,623,028 A | 4/1997 | Fitzgerald et al. | |
| 5,641,831 A | 6/1997 | Hamilton | |
| 5,652,287 A | 7/1997 | Sullivan et al. | |
| 5,691,067 A | 11/1997 | Patel | |
| 5,692,629 A | 12/1997 | Burns | |
| 5,716,699 A | 2/1998 | Reo | |
| 5,767,185 A | 6/1998 | Reo | |
| D400,402 S | 11/1998 | Petkovich, Jr. | |
| 5,867,867 A | 2/1999 | Kessler | |
| 5,929,143 A | 7/1999 | Ward et al. | |
| 5,932,649 A | 8/1999 | Hergenrother et al. | |
| 5,955,149 A | 9/1999 | Kuziemka | |
| 5,981,610 A | 11/1999 | Meguriya et al. | |
| 6,004,496 A | 12/1999 | Reo | |
| 6,022,816 A | 2/2000 | Dewar | |
| 6,077,592 A | 6/2000 | Azuma et al. | |
| 6,085,923 A | 7/2000 | Yaniger | |
| 6,146,673 A | 11/2000 | Ferguson | |
| 6,153,275 A | 11/2000 | Yaniger | |
| 6,197,359 B1 | 3/2001 | Hompanera | |
| 6,221,451 B1 | 4/2001 | Lauer et al. | |
| 6,245,431 B1 | 6/2001 | Gridwold | |
| 6,339,124 B1 | 1/2002 | Igarashi et al. | |
| 6,348,243 B1 | 2/2002 | Fuller et al. | |
| 6,506,331 B2 | 1/2003 | Meguriya | |
| 6,528,152 B1 | 3/2003 | Piriwe | |
| 6,552,096 B2 | 4/2003 | Meguriya | |
| 6,613,406 B1 | 9/2003 | Yaniger | |
| 6,616,997 B1 | 9/2003 | Lauer et al. | |
| 6,750,279 B1 | 6/2004 | Wang | |
| 6,797,223 B2 | 9/2004 | Beale et al. | |
| 6,976,597 B2 | 12/2005 | Jahrling et al. | |
| 7,028,367 B2 | 4/2006 | Sharabura et al. | |
| 7,150,221 B2 | 12/2006 | Morgan | |
| 2001/0043977 A1 | 11/2001 | Hompanera | |
| 2002/0103275 A1 | 8/2002 | Nogueria de Sousa | |
| 2002/0110627 A1 | 8/2002 | Hirano | |
| 2002/0171027 A1 | 11/2002 | Martellato et al. | |
| 2003/0047838 A1 | 3/2003 | Beale et al. | |
| 2003/0161985 A1 | 8/2003 | Lauer | |
| 2003/0165683 A1 | 9/2003 | Sharabura et al. | |
| 2003/0192847 A1 | 10/2003 | Jahrling et al. | |
| 2003/0229961 A1 | 12/2003 | Barnett | |
| 2004/0096558 A1 | 5/2004 | Meroni | |
| 2004/0249059 A1 | 12/2004 | Akbar et al. | |
| 2005/0165138 A1 | 7/2005 | Holmes et al. | |

FOREIGN PATENT DOCUMENTS

| | | |
|---|---|---|
| AU | 691497 | 11/1994 |
| AU | 734250 | 2/1999 |
| AU | 721157 | 12/1999 |
| AU | 730928 | 4/2000 |
| AU | 783552 | 6/2001 |
| AU | 2001/290763 B2 | 3/2002 |
| AU | 749676 | 5/2002 |
| CA | 1 177 600 | 10/1981 |
| DE | 102 58 345 A1 | 6/2004 |
| EP | 0 346 887 A1 | 12/1989 |
| EP | 0 496 194 A1 | 7/1992 |
| EP | 0 507 481 A2 | 10/1992 |
| EP | 0220898 | 10/1993 |
| EP | 0577357 | 1/1994 |
| EP | 0 773 090 A1 | 5/1997 |
| EP | 0 992 195 A1 | 4/2000 |
| EP | 0992195 | 4/2000 |
| EP | 1034907 | 9/2000 |
| EP | 1 088 855 A1 | 4/2001 |
| EP | 1 197 149 A2 | 4/2002 |
| EP | 1197149 | 4/2002 |
| EP | 1233014 | 8/2002 |
| FR | 1 518 450 | 4/1967 |
| FR | 2658034 | 8/1991 |
| FR | 2710001 | 3/1995 |
| FR | 2715407 | 7/1995 |
| FR | 2747885 | 10/1997 |
| FR | 2747886 | 10/1997 |
| GB | 1 207 674 | 10/1970 |
| GB | 1 563 051 | 12/1978 |
| JP | 05-117530 | 5/1993 |
| SI | 20738 | 6/2002 |
| WO | WO-80/01559 | 8/1980 |
| WO | WO-99/34685 | 7/1999 |
| WO | WO-99/40794 | 8/1999 |
| WO | WO-03/004367 A1 | 1/2003 |
| WO | WO-03/020817 A1 | 3/2003 |
| WO | WO-03/029130 A1 | 4/2003 |

OTHER PUBLICATIONS

Author Unknown; Denmarle Flexipan Information Sheet; Date Unknown; www.demarleusa.com; pp. 1-3.

Tefal Company website; "Proflex"; www.tefal.co.uk; publication date unknown; 2 pages.

Affidavit of Jeannie Holmes; executed Nov. 2, 2004; 1 page.

PCT International Search Report for International Application No. PCT/US2004/017697 dated Dec. 8, 2004.

PCT International Search Report for International Application No. PCT/US2005/047455 dated Aug. 18, 2006.

PCT International Search Report for International Application No. PCT/US02/39430 dated May 27, 2003.

Austimont; Algoflon Properties and Applications Selection Guide, Jul. 1999, 8 pages.

Abstract of Patent Application No. 93119903, entitled Method of Producing Wiper Blade Rubber and Wiper Blade Rubber Produced Thereby, published Apr. 7, 1999, see pp. 3-4 of nerac.com Retro Search.

Abstract of Patent Application No. 87901997, entitled Power Atomizing Methods and Apparatus, published Dec. 27, 1991, see pp. 4-6 of nerac.com Retro Search.

Abstract of Patent Application No. 08169727, entitled Aliphatic Nylon Solution and Wiper Blade Coated Therewith, published Jan. 13, 1998, see pp. 6-7 of nerac.com Retro Search.

Abstract of Patent Application No. 08172837, entitled Coating Composition for Wiper Blade Rubber, published Jan. 6, 1998, see p. 7 of nerac.com Retro Search.

Abstract of Patent Application No. 08146423, entitled Coating Composition for Repairing Wiper Blade Rubber, published Nov. 18, 1997, see pp. 7-8 of nerac.com Retro Search.

Abstract of Patent Application No. 07298266, entitled Wiper Blade, published May 27, 1997, see p. 8 of nerac.com Retro Search.

Abstract of Patent Application No. 07267191, entitled Solder Paste Pringing Squeegee, published Apr. 28, 1997, see pp. 8-9 of nerac.com Retro Search.

Abstract of Patent Application No. 837891, entitled Method of Making a Silicone Rubber Windshield Wiper, Dec. 21, 1999, see pp. 9-10 of nerac.com Retro Search.

Abstract of Patent Application No. 837754. entitled Moldable and Tintable Silicone Rubber Composition for Windshield Wiper Blade.

Abstract of Patent Application No. 603920, entitled Silicone Rubber Windshield Wiper Blade, Feb. 10, 1998, see pp. 11-12 of nerac.com Retro Search.

Abstract of Patent Application No. 358567, entitled Method of Producing Rubber Wiper Blades, Dec. 26, 1995, see pp. 11-12 of nerac.com Retro Search.

Abstract of Patent Application No. 101016, entitled Wiper and Spreader Blades with Conductive Coating, Mar. 21, 1995, see p. 12 of nerac.com Retro Search.

Abstract of Patent Application No. 584539, entitled Non Stick Windshield Wipers, Apr. 28, 1992, see p. 13 of nerac.com Retro Search.

Abstract of Patent Application No. 112531, entitled Windshield Wiper Structure, Aug. 1, 1989, see pp. 13-14 of nerac.com Retro Search.

Abstract of Patent Application No. 839284, entitled Powder Atomizing Methods and Apparatus, Mar. 15, 1988, see pp. 14-15 of nerac.com Retro Search.

Abstract of Patent Application No. 05050875, entitled Window Shield System for Automobile, published Sep. 20, 1994, see pp. 15-16 of nerac.com Retro Search.

Abstract of Patent Application No. 03311899, entitled Silicon Rubber Composition for Wiper Blade, published May 14, 1993, see p. 16 of nearac.com Retro Search.

Abstract of Patent Application No. 63229588, entitled Wiper Blade, published Mar. 16, 1990, see pp. 16-17 of nerac.com Retro Search.

Abstract of Patent Application No. 62215594, entitled Manufacture of Chip Type Solid Electrolytic Capacitor, published Mar. 6, 1989, see p. 17 of nerac.com Retro Search.

Abstract of Patent Application No. 58134257, entitled Windshield Wiper for Automobile, published Feb. 8, 1985, see pp. 17-18 of nerac.com Retro Search.

Abstract of Japanese Patent Application No. 10-3380003, Publication No. 2000-160019, entitled Silicone Rubber Composition for Wiper Blade, published Jun. 13, 2000.

Abstract of Japanese Patent Application No. 03-311899, Publication No. 05-117530, entitled Silicone Rubber Composition for Wiper Blade, published May 14, 1993.

Non-Final Office Action dated Oct. 10, 2007 for U.S. Appl. No. 11/025,125.

Response to Non-Final Office Action dated Apr. 10, 2008 for U.S. Appl. No. 11/025,125.

Final Office Action dated Jun. 30, 2008 for U.S. Appl. No. 11/025,125.

Non-Final Office Action dated Oct. 11, 2007 for U.S. Appl. No. 11/025,175.

Notice of Abandonment dated May 13, 2008 for U.S. Appl. No. 11/025,175.

Non-Final Office Action dated Oct. 11, 2007 for U.S. Appl. No. 11/025,108.

Response to Non-Final Office Action dated Apr. 11, 2008 for U.S. Appl. No. 11/025,108.

Final Office Action dated Jul. 3, 2008 for U.S. Appl. No. 11/025,108.

Non-Final Office Action dated Oct. 3, 2007 for U.S. Appl. No. 11/025,038.

Response to Non-Final Office Action dated Apr. 3, 2008 for U.S. Appl. No. 11/025,038.

Final Office Action dated Jul. 1, 2008 for U.S. Appl. No. 11/025,038.

Non-Final Office Action dated Nov. 12, 2004 for U.S. Appl. No. 10/764,094.

Non-Final Office Action dated Jun. 21, 2005 for U.S. Appl. No. 10/764,094.

Non-Final Office Action dated Dec. 6, 2005 for U.S. Appl. No. 10/764,094.

Interview Summary dated Mar. 8, 2005 for U.S. Appl. No. 10/764,094.

Final Office Action dated May 24, 2006 for U.S. Appl. No. 10/764,094.

Advisory Action dated Oct. 23, 2006 for U.S. Appl. No. 10/764,094.

Non-Final Office Action dated Feb. 27, 2007 for U.S. Appl. No. 10/764,094.

Non-Final Office Action dated Apr. 7, 2008 for U.S. Appl. No. 10/764,094.

Final Office Action dated Sep. 18, 2007 for U.S. Appl. No. 10/764,094.

Interview Summary dated Aug. 4, 2005 for U.S. Appl. No. 10/313,346.

Non-Final Office Action dated Jul. 23, 2007 for U.S. Appl. No. 11/358,525.

Notice of Allowance and Fee(s) Due dated Apr. 16, 2008 for U.S. Appl. No. 11/358,525.

Notice of Allowance and Fee(s) Due dated Jan. 23, 2006 for U.S. Appl. No. 10/313,346.

PCT International Search Report for International Application No. PCT/US2005/002028 dated May 23, 2005.

Notice of Allowance and Fee(s) Due dated May 2, 2007 for U.S. Appl. No. 10/685,052.

* cited by examiner

FLEXIBLE BAKEWARE

CROSS-REFERENCE TO RELATED APPLICATIONS

This application is a continuation of U.S. patent application Ser. No. 10/685,052, filed Oct. 14, 2003 now U.S. Pat. No. 7,282,532, which claims the benefit of and priority to U.S. Provisional Application 60/476,325, filed Jun. 6, 2003. Both of the applications are hereby incorporated by reference.

BACKGROUND OF THE INVENTION

1. Field of the Invention

This invention relates generally to flexible bakeware and in particular to an improved flexible bakeware container that is made from a novel compound and includes a carrier for assisting a user in carrying the bakeware container.

2. Description of Related Art

Flexible bakeware is typically made from a silicone rubber formulation. The silicone composition prevents strong odors from being transferred to the food, yet provides a tough, temperature resistant material that, due to its flexibility, allows food to be removed more easily than with traditional bakeware. One downside to using a silicone composition for bakeware is that the flexibility of the material makes it difficult to handle. The bakeware cannot be easily carried with one hand. Instead, it must be fully supported under its bottom surface, and most users simply place a metal cooking sheet or other rigid pan underneath the bakeware to transfer the bakeware to and from the oven. This solution is impractical because the presence of a solid sheet of metal underneath the flexible bakeware can provide inconsistent (and uneven) baking of the food product contained by the bakeware. More specifically, the sides and top of the bakeware experience convective heating from the hot air within the oven. The bottom of the bakeware experiences conductive heating since it is in direct contact with the solid metal cooking sheet. This difference in heating methods can cause uneven cooking of the food product. The inconvenience of using a cooking sheet to transport flexible bakeware is also a drawback.

A need therefore exists for an apparatus that could be used in conjunction with a flexible baking container that would permit easy transport of the baking container. A need further exists for an apparatus that could be incorporated into the flexible baking container so that together the device and bakeware are a self-contained unit. Still another need exists for an apparatus that can be readily removed from the baking container periodically for cleaning.

Flexible bakeware also experiences release problems with certain foods. Compared to conventional non-flexible bakeware, it is often easier to remove foods from flexible bakeware because the basin containing the food product can be turned inside out. However, with certain foods such as muffins, cakes, or breads, residue from the foods may remain stuck to the flexible bakeware, thereby causing an uneven and unattractive outer surface on the food product following removal from the bakeware.

One solution to the problem of food release is to pre-lubricate a baking container with cooking spray, cooking oil, or flour. While this can prevent food from sticking to baking containers, the solution is undesirable because it involves additional steps in cooking the food (i.e. the step of pre-lubricating) and requires additional cooking supplies (i.e. the spray, oil, or flour). Another drawback is that the use of oils or flour can alter the taste and texture of the baked food product.

A need therefore exists for flexible bakeware that has improved food release qualities as compared to currently used flexible bakeware. A need further exists for a compound that can be easily and inexpensively manufactured into flexible bakeware. The compound should be non-toxic and should not impart an odor or taste to food products prepared in the bakeware.

BRIEF SUMMARY OF THE INVENTION

The problems presented by existing flexible bakeware are solved by the present invention. A flexible bakeware compound is provided that includes a methyl vinyl silicone polymer from about 40 to 70 weight percent, a filler from about 5 to 50 weight percent, a curing agent from about 0.1 to 5 weight percent, and polytetrafluoroethylene from about 0.1 to 15 weight percent. In a preferred embodiment, the polytetrafluoroethylene is present in an amount of about 6 percent. The filler is preferably ground quartz, and the curing agent is preferably chloro platanic acid.

Also provided by the present invention is a flexible bakeware compound having a methyl vinyl silicone polymer of about 61 weight percent, a filler of about 28.5 weight percent, a curing agent of about 0.57 weight percent, and polytetrafluoroethylene of about 6 weight percent. Preferably, the filler is ground quartz, and the curing agent is chloro platanic acid. The flexible bakeware compound may also include high vinyl silicone gum from about 1.1 weight percent, a pigment from about 1.1 weight percent, zinc stearate from about 0.14 weight percent, silicone hydride from about 1.7 weight percent, and ethynl cyclohexanol from about 0.01 weight percent.

A method for baking a food product is also provided by the present invention. The method includes the step of providing a flexible baking container formed from an addition-cured silicone polymer having polytetrafluoroethylene from about 0.1 to 15 weight percent. A food product is deposited in the baking container, and the container is placed in an oven at a baking temperature for a predetermined time until the food product is baked. The food product is then removed from the baking container.

The invention further provides an elastomeric baking container having a basin and shoulder surrounding the basin. A receiving channel is disposed in the shoulder of the baking container and receives a carrier. The placement of the carrier within the receiving channel provides additional rigidity to the shoulder, which makes the baking container easier to carry.

A method of baking a food product is provided by the present invention and includes the steps of providing a flexible baking container having a basin and a shoulder. A receiving channel is disposed in the shoulder, and a carrier is received by the receiving channel. A food product is deposited in the baking container, and the flexible baking container is carried to an oven by gripping the carrier, or some portion of the carrier along with the shoulder of the baking container. The baking container is placed in an oven at a baking temperature for a predetermined amount of time until the food product is baked.

The carrier of the present invention can be provided in many different shapes and sizes. The shape of the carrier will generally match the shape of the receiving channel. For example, the carrier can be made from a rod with a circular cross section. The receiving channel in this case would have a circular cross section. In some instances, a portion of the carrier may extend out of the shoulder of the bakeware as a handle. The presence of handles is not required but may make the bakeware easier to carry.

Another carrier that may be used is one for a plurality of muffin cups (i.e. bakeware, or baking containers). This carrier is preferably a flat, rigid plate with a plurality of apertures. A flexible muffin cup is placed within each aperture so that a receiving channel on a shoulder of the muffin cup receives a portion of the flat carrier. The receiving channel may even have a depression for receiving a lip formed on an edge of the carrier's aperture. When the depression engages the lip of the carrier, the muffin cup is more securely attached to the carrier and less likely to become inadvertently disengaged from the carrier.

Other objects, features, and advantages of the present invention will become apparent with reference to the drawings and detailed description that follow.

DETAILED DESCRIPTION OF THE PREFERRED EMBODIMENT

Figure 1:
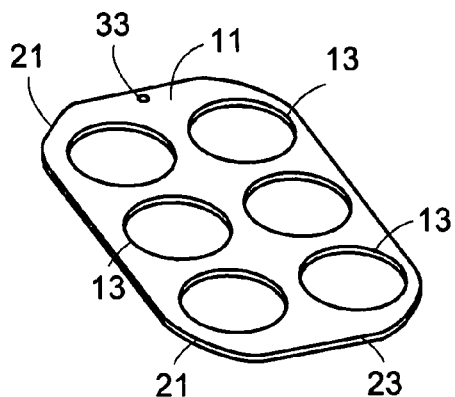
FIG. 1 depicts a perspective view of a flexible bakeware carrier for a plurality of flexible muffin cups according to a preferred embodiment of the present invention.
Figure 2:
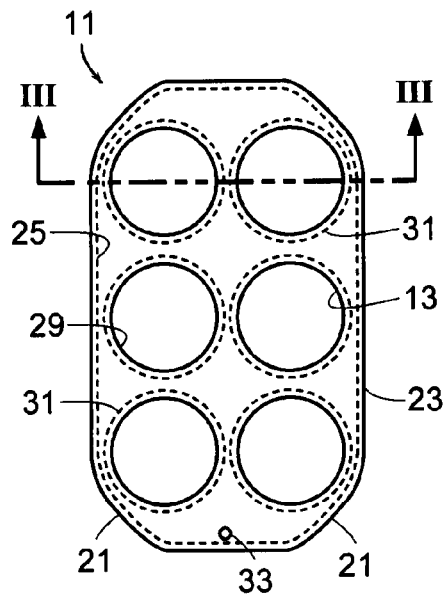
FIG. 2 illustrates a top view of the flexible bakeware carrier of FIG. 1.
Figure 3:
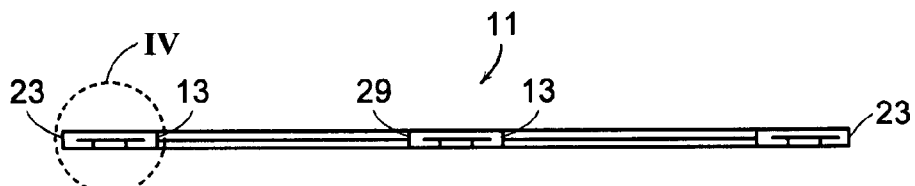
FIG. 3 depicts a cross-sectional front view of the flexible bakeware carrier of FIG. 2 taken at III-III.
Figure 4:
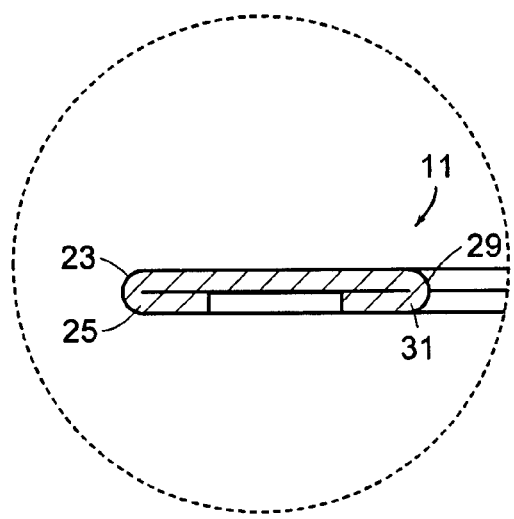
FIG. 4 illustrates an enlarged front view of the of flexible bakeware carrier of FIG. 3 taken at Detail IV.

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical mechanical, structural, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

In describing the present invention, the term "elastomer" refers generally to a polymeric material that has rubberlike properties. More specifically, most elastomers have elongation rates greater than 100% and a significant amount of resilience. The resilience of a material refers to the material's ability to recover from an elastic deformation. Examples of elastomers could include, but are not limited to, natural rubbers, polyisoprene, styrene butadiene rubber, chloroprene rubber, polybutadiene, nitrile rubber, butyl rubber, ethylene propylene rubber, ethylene propylene diene monomer, chlorosulfonated polyethylene, polysulfide rubber, polyurethane, and silicones.

The term "flexible" refers to an object or material that is able to bent or flexed. The use of the term flexible in connection with a material or bakeware of the present invention generally refers to a material or bakeware made from an elastomer or other material that allows the container portion, or basin, of the bakeware to be at least partially turned inside out without plastic deformation of the material.

Referring to FIGS. 1-4, a carrier 11 according to one embodiment of the present invention is illustrated. The carrier apparatus 11 is used in conjunction with flexible muffin cups.

Carrier 11 is a substantially rigid, flat plate made from either metal or temperature-resistant plastic. Carrier 11 includes a plurality of apertures 13, each adapted to receive a flexible muffin cup. Carrier 11 is preferably rectangular in shape with a chamfer 21 at each corner of the carrier. Carrier 11 is preferably made from brushed stainless steel, and all perimeter edges 23 of the carrier 11 have been rolled to form a perimeter lip 25 (see FIG. 4). Similarly, the edges 29 of apertures 13 have also been rolled to form perimeter lips 31. By rolling the exposed edges 23, 25 of the carrier 11, the sharpness of the edges is eliminated. Carrier 11 also includes a hanger hole 33 at one end of the carrier 11 for allowing the carrier to be hung on a kitchen wall.

Figure 5:
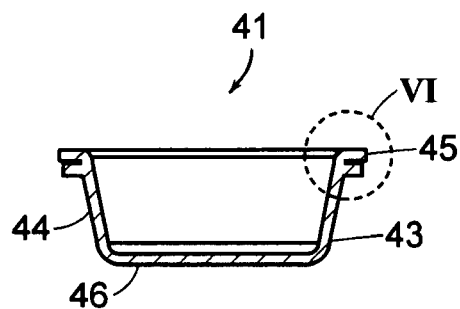
FIG. 5 depicts a cross-sectional front view of a flexible muffin cup according to a preferred embodiment of the present invention, the muffin cup designed for use with the flexible bakeware carrier of FIG. 1.
Figure 6:
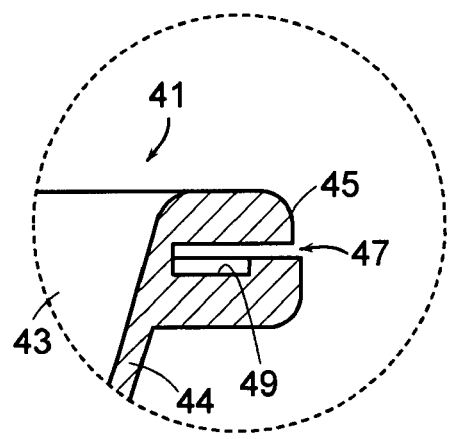
FIG. 6 illustrates an enlarged front view of the flexible muffin cup of FIG. 5 taken at Detail VI.

Referring to FIGS. 5 and 6, a flexible baking container, or muffin cup 41, according to a preferred embodiment of the present invention includes a basin 43 formed by a substantially cylindrical, tapering wall 44 integrally connected to a floor 46. One end of wall 44 terminates in a shoulder 45, the shoulder having a receiving channel 47. Receiving channel 47 preferably includes a depression 49 that is adapted to receive the perimeter lip 31 of carrier 11. In order to obtain optimum flexibility and release, the wall thickness of each muffin cup should be between 0.020 and 0.100 inches. Preferably, the wall thickness is 0.050-0.075 inches.

In operation, each aperture 13 on carrier 11 receives a muffin cup 41 such that a portion of the carrier 11 fits within receiving channel 47. When installed, the perimeter lip 31 of the carrier 11 is firmly seated in the depression 49 of the receiving channel 47. The engagement of the lip 31 by depression 49 more firmly secures the muffin cups 41 on the carrier and prevents accidental or inadvertent disengagement of the muffin cups 41 and the carrier 11.

The carrier 11 provides rigidity to the muffin cups 41 in an area around each shoulder 45 and allows a user to carry the flexible muffin cups 15 with one hand. The flexibility of the muffin cups 41 allows a user to easily remove the cups from the carrier 11. The removal of the muffin cups could aid a user in removing food from the muffin cup, although it is not necessary to remove the cup to effectuate release of a food product. The ease with which the muffin cups can be removed also promotes the use of muffin cups having different shapes and depths. For example, a muffin cup having a basin 17 that is heart shaped may be used to bake heart-shaped muffins on Valentine's Day. Other possible shapes include without limitation stars, clover leaves, squares, triangles, and diamonds.

Figure 7:
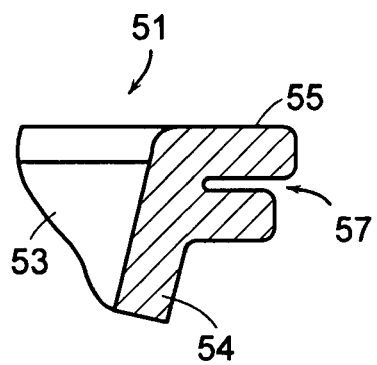
FIG. 7 depicts an enlarged front view of a flexible muffin cup according to an alternative embodiment of the present invention, the view being taken at an area of the flexible muffin cup similar to that shown in FIG. 6.
Figure 8:
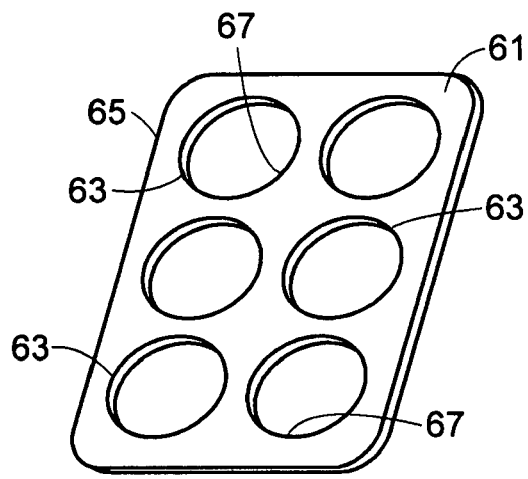
FIG. 8 illustrates a perspective view of a flexible bakeware carrier for a plurality of flexible muffin cups according to an alternative embodiment of the present invention.
Figure 9:
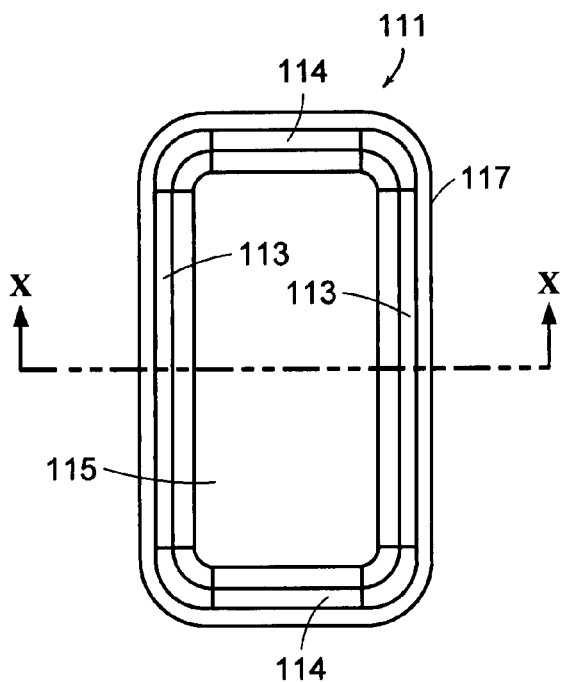
FIG. 9 depicts a top view of a rectangular, flexible bakeware according to a preferred embodiment of the present invention.
Figure 10:
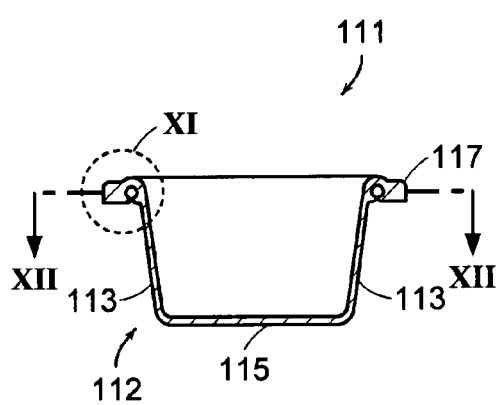
FIG. 10 illustrates a cross-sectional front view of the rectangular, flexible bakeware of FIG. 9 taken at X-X.

Referring to FIGS. 7 and 8, a muffin cup 51 and a carrier 61 according to alternative embodiments of the present invention are illustrated. Muffin cup 51 is similar to muffin cup 41 and includes a basin 53 formed by a substantially cylindrical, tapering wall 54 connected to a floor (not shown) at one end and terminating in a shoulder 55 at another end. Shoulder 55 includes a receiving channel 57, but unlike muffin cup 41, does not include a depression 49.

Muffin cup 51 is designed for use with a carrier such as carrier 11, or preferably carrier 61. Referring to FIG. 8, carrier 61 is a rectangular, flat plate made from metal or temperature-resistant plastic. Carrier 61 includes a plurality of apertures 63 for receiving muffin cups 51. The primary difference between carrier 61 and carrier 11 (FIGS. 1-4) is that carrier 61 does not include rolled lips at perimeter edges 65 or edges 67 of the apertures. The lack of a lip at edges 67 allows the carrier 11 to better mate with muffin cup 61, which includes no depression in receiving channel 57.

Figure 11:
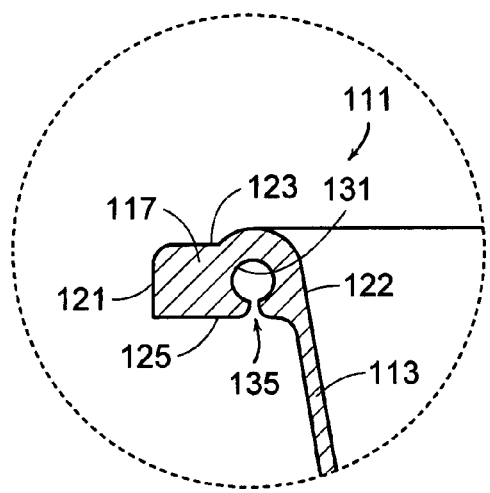
FIG. 11 depicts an enlarged front view of the rectangular, flexible bakeware of FIG. 10 taken at Detail XI.

Referring to FIGS. 9-12, a rectangular, flexible baking container 111 according to a preferred embodiment of the present invention includes a basin 112 formed by a pair of major walls 113 and a pair of minor walls 114, the walls 113, 114 being integrally joined to each other and at one end to a floor 115. A shoulder 117 is formed at an end of the walls 113, 114 opposite floor 115, the shoulder 117 extending completely around the perimeter of the baking container 111. Shoulder 117 includes an outer surface 121, an inner surface 122, an upper surface 123, and a lower surface 125. A receiving channel 131 having a circular cross section is disposed in the shoulder 117 with an entry slot 135 positioned between the lower surface 125 of the shoulder 117 and the receiving channel 131. In the preferred embodiment, the entry slot 135 is disposed adjacent the lower surface 125 (as shown in FIG. 11), but it is conceivable that the entry slot 135 could be disposed adjacent the outer surface 121, the inner surface 122, or the upper surface 123.

Figure 12:
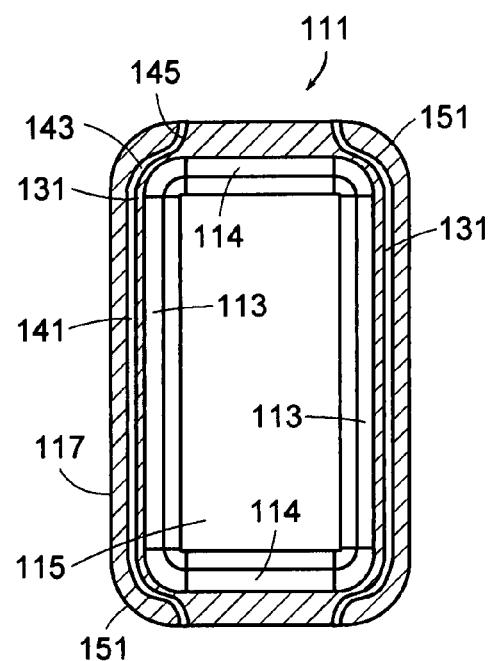
FIG. 12 illustrates a cross-sectional top view of the rectangular, flexible bakeware of FIG. 10 taken at XII-XII.

Referring more specifically to FIG. 12, the receiving channel 131 and entry slot 135 are not continuous around the entire perimeter of the flexible baking container 111. Instead, the receiving channel 131 includes a central portion 141 that runs continuously in the shoulder 117 adjacent each major wall 113. As the receiving channel 131 approaches corner portions 151 of the shoulder 117, a turning portion 143 of the receiving channel 131 follows the shoulder around the corner portion 151. An exit portion 145 of the receiving channel then turns in a direction opposite minor walls 114 and exits the outer surface 121 of the shoulder 117. Because of the discontinuous nature of the receiving channel 131, the baking container 111 actually contains a pair of receiving channels 131 as illustrated in FIG. 12.

The preferred location of the central portion 141 of the receiving channel 131 is in the shoulder 117 adjacent each major wall 113. This configuration provides the most support for the carrier that is received by the receiving channel 131 (explained in more detail below). However, a person of ordinary skill in the art will recognize that the central portion 141 of each receiving channel 131 could instead be located in the shoulder adjacent each minor wall 114.

Figure 13:
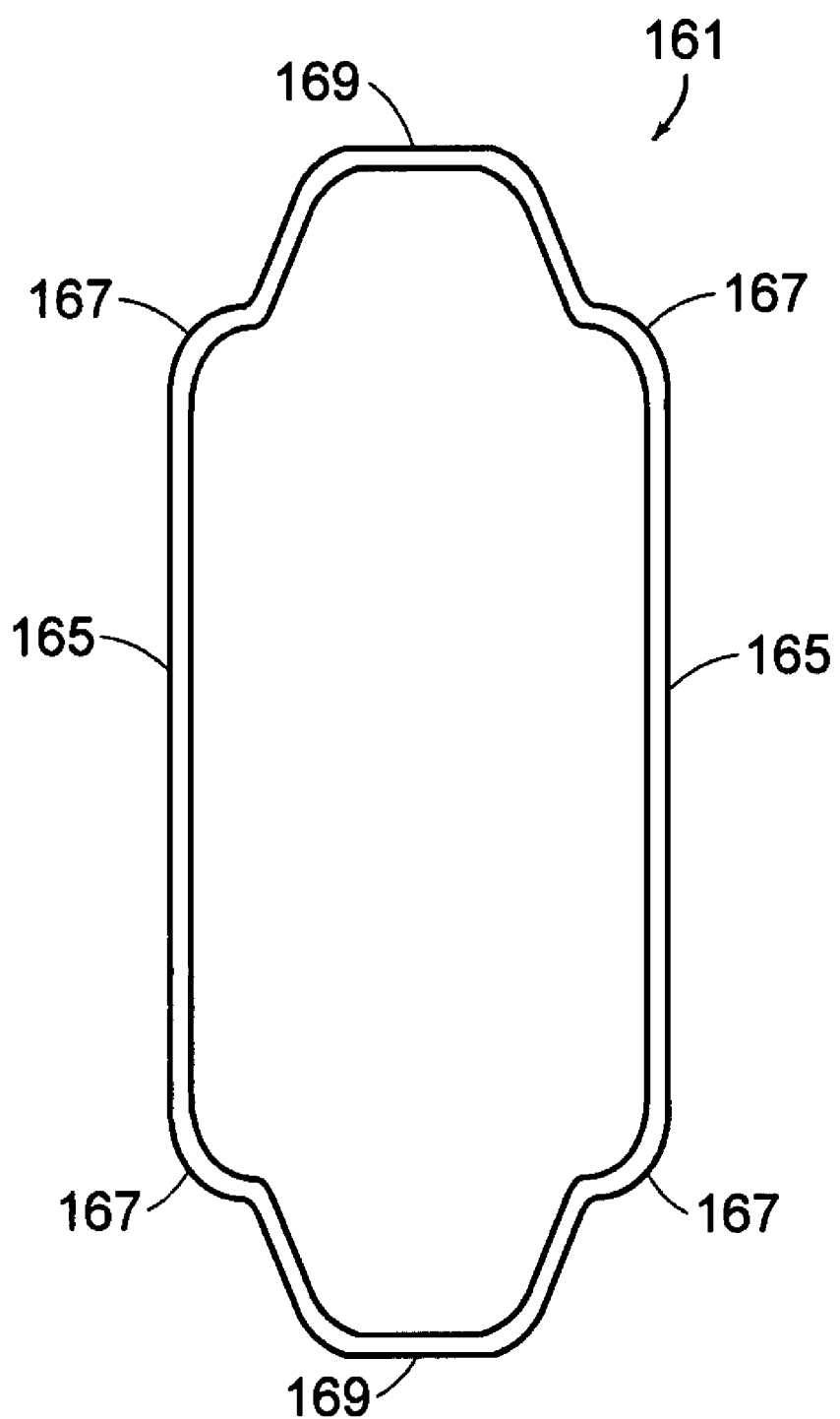
FIG. 13 depicts a top view of a flexible bakeware carrier according to a preferred embodiment of the preferred invention, the carrier designed for use with the flexible bakeware of FIG. 9.

Referring to FIG. 13, a carrier 161 according to a preferred embodiment of the present invention is used in conjunction with flexible baking container 111. Carrier 161 is formed by a substantially rigid rod having a substantially circular cross section and made of metal or temperature-resistant plastic. Preferably, the material composition of the rod is 304 stainless steel. Carrier 161 includes a pair of central stays 165 that are substantially parallel to one another and are joined at each end to an arcuate stay 167. An end of each arcuate stay 167 is joined to one end of a handle 169. Together, the pair of central stays 165, the four arcuate stays 167, and the pair of handles 169 form a closed loop. The shape and length of the central stays and the arcuate stays closely approximate those of central portion 141 and turning portion 143 of the receiving channel 131. Preferably, the central stays 165, arcuate stays 167, and handles 169 are welded together from stainless steel rods, but the carrier 161 could be formed using any other suitable manufacturing techniques know to those of ordinary skill in the art.

In operation, carrier 161 is received by flexible baking container 111 by inserting the centrals stays 165 and arcuate stays 167 through the entry slot 135 of the baking container 111 and into the receiving channel 131. The flexible properties of the baking container 111 allow the shoulder 117 to bend such that the entry slot 135 is temporarily enlarged to accommodate the carrier 161 as it passes through the entry slot 135 and into the receiving channel 131. After the central stays 165 are positioned within the central portions 141 of the receiving channels 131 and the arcuate stays 167 are positioned within the turning portions 143 of the receiving channels 131, the shoulder 117 elastically returns to its original shape. With the shoulder in a "non-deformed" shape, the entry slot 135 is again smaller than the receiving channel 131, which secures carrier 161 within the receiving channel 131.

With the carrier 161 installed in the receiving channel 131, a portion of the handle 169 is disposed within the exit portion 145 of the receiving channel, but the majority of the handle 169 is located outside the walls of the flexible baking container 111. Handle 169 enables a user of the flexible baking container 111 to easily lift and carry the baking container 111 by holding either or both handles on the that portion of the handle 169 that protrudes from the baking container.

The carrier 161 provides rigidity to the flexible baking container 111 in an area around each shoulder 117 and allows a user to more easily lift and carry the baking container 111. The flexibility of the baking container 111 allows a user to easily remove the carrier 161 from the receiving channel 131 of the baking container 111. The removal of the carrier 161 could aid a user in removing food from the baking container 111, although it is not necessary to remove the carrier 161 to effectuate release of a food product.

Figure 17:
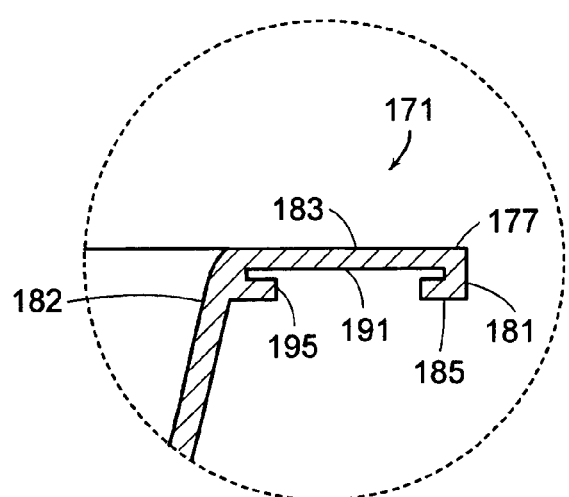
FIG. 17 depicts an enlarged front view of the rectangular, flexible bakeware of FIG. 16 taken at Detail XVII.
Figure 18:
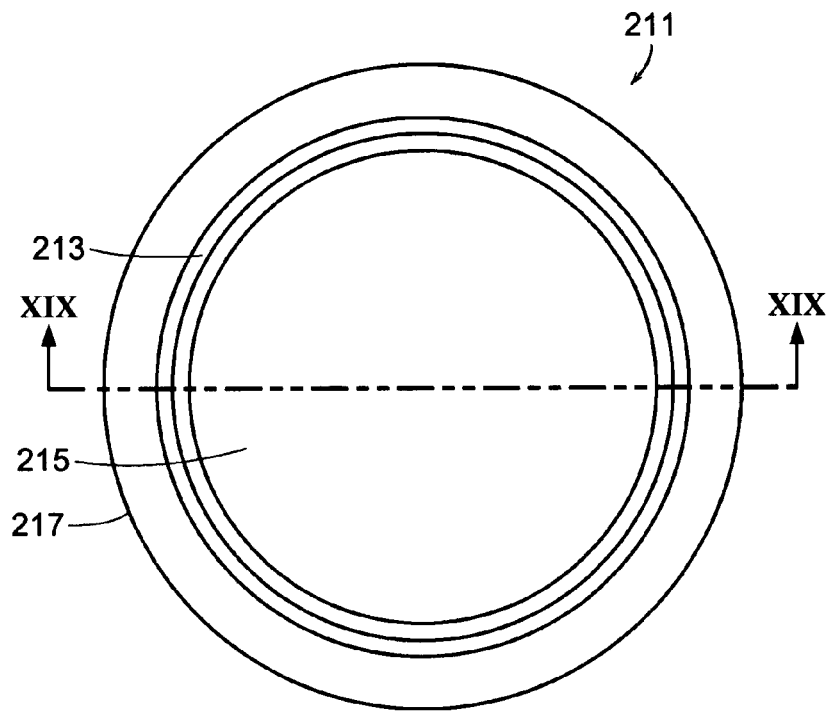
FIG. 18 illustrates a top view of a round, flexible bakeware according to a preferred embodiment of the present invention.
Figure 19:
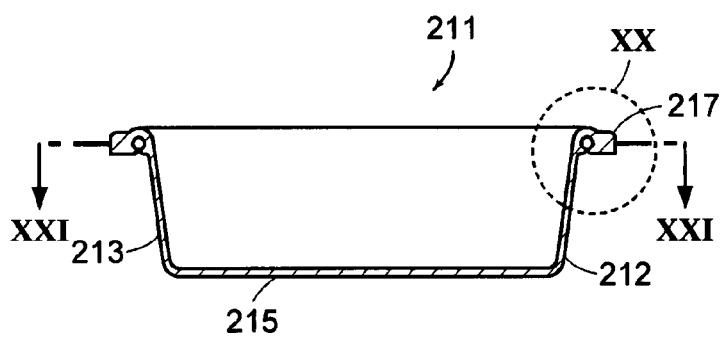
FIG. 19 depicts a cross-sectional front view of the round, flexible bakeware of FIG. 18 taken at XIX-XIX.

Referring to FIGS. 14-17, a rectangular, flexible baking container 171 according to an alternative embodiment of the present invention includes a basin 172 formed by a pair of major walls 173 and a pair of minor walls 174, the walls 173, 174 being integrally joined to each other and at one end to a floor 175. A shoulder 177 is formed at an end of the walls 173, 174 opposite floor 175, the shoulder 177 extending completely around the perimeter of the baking container 171. Shoulder 177 includes an outer surface 181, an inner surface 182, an upper surface 183, and a lower surface 185. A receiving channel 191 having a rectangular cross section is disposed in the shoulder 177 with an entry slot 195 positioned between the lower surface 185 of the shoulder 177 and the receiving channel 191. In the preferred embodiment, the entry slot 195 is disposed adjacent the lower surface 185 (as shown in FIG. 17), but it is conceivable that the entry slot 195 could be disposed adjacent the outer surface 181, the inner surface 182, or the upper surface 183.

The receiving channel 191 and entry slot 195 are preferably continuous around the entire perimeter of the flexible baking container 171. However, it is conceivable that a discontinuous receiving channel 191 and entry slot 195 could be used similar to those of baking container 111 (see FIG. 12).

Figure 14:
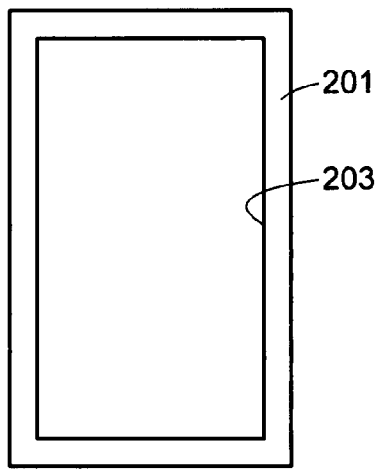
FIG. 14 illustrates a top view of a flexible bakeware carrier according to an alternative embodiment of the present invention.
Figure 15:
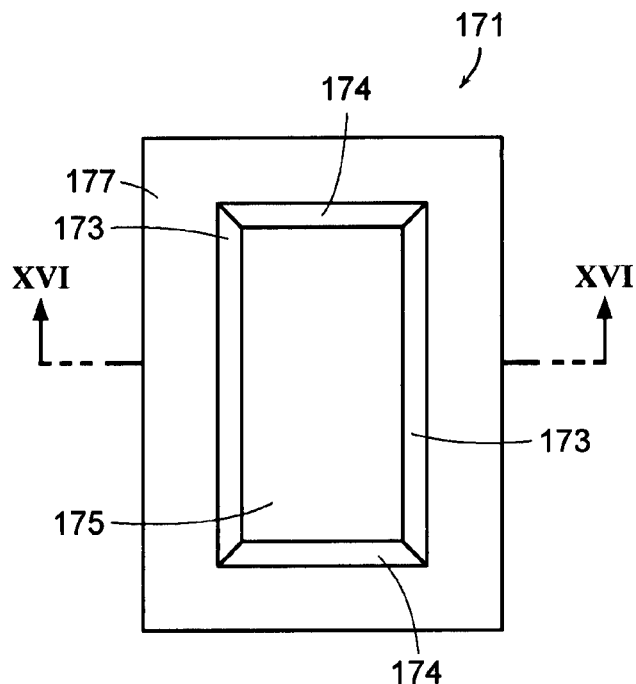
FIG. 15 depicts a top view of a rectangular, flexible bakeware according to an alternative embodiment of the present invention, the bakeware designed for use with the carrier of FIG. 14.
Figure 16:
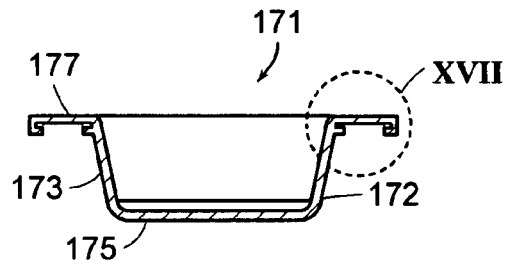
FIG. 16 illustrates a cross-sectional front view of the rectangular, flexible bakeware of FIG. 15 taken at XVI-XVI.

Referring more specifically to FIG. 14, a carrier 201 according to an alternative embodiment of the present invention is used in conjunction with flexible baking container 171. Carrier 201 is a rectangular plate having a central aperture 203 and is made of metal or temperature-resistant plastic. The shape and size of carrier 201 closely approximate those of the receiving channel 191 of baking container 171.

In operation, carrier 201 is received by flexible baking container 171 by inserting the carrier 201 through the entry slot 195 of the baking container 171 and into the receiving channel 191. The flexible properties of the baking container 171 allow the shoulder 177 to bend such that the entry slot 195 is temporarily enlarged or deformed to accommodate the carrier 201 as it passes through the entry slot 195 and into the receiving channel 191. After the carrier 201 is positioned within the receiving channel 191, the shoulder 177 elastically returns to its original shape. With the shoulder 177 in a "non-deformed" shape, the entry slot 195 is again smaller than the receiving channel 191, which secures carrier 201 within the receiving channel 191.

Carrier 201 provides rigidity to the flexible baking container 171 in an area around shoulder 177 and allows a user to more easily lift and carry the baking container 171. The flexibility of the baking container 171 allows a user to easily remove the carrier 201 from the receiving channel 191 of the baking container 171. The removal of the carrier 201 could aid a user in removing food from the baking container, although it is not necessary to remove the carrier 201 to effectuate the release of a food product.

Figure 20:
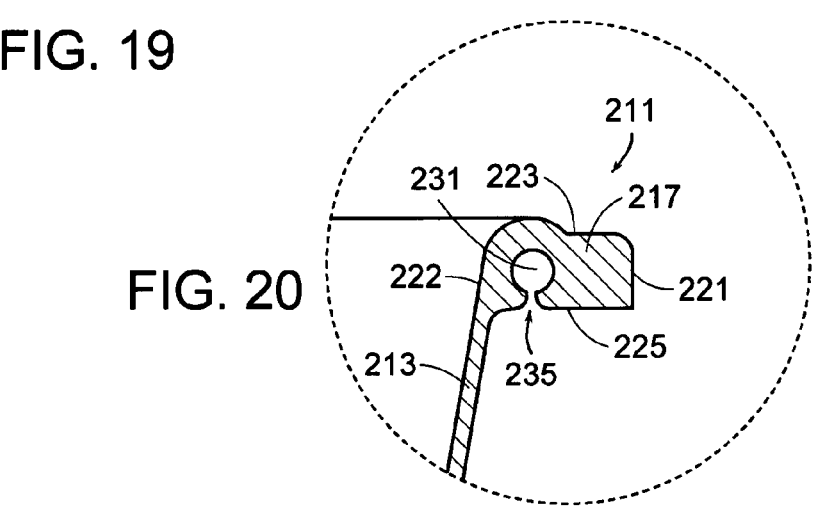
FIG. 20 illustrates an enlarged front view of the round, flexible bakeware of FIG. 19 taken at Detail XX.

Referring to FIGS. 18-21, a round, flexible baking container 211 according to a preferred embodiment of the present invention includes a basin 212 formed by a substantially cylindrical, tapering wall 213 that is integrally joined at one end to a floor 215. A shoulder 217 is formed at an end of the wall 213 opposite floor 215, the shoulder 217 extending completely around the perimeter of the baking container 211. Shoulder 217 includes an outer surface 221, an inner surface 222, an upper surface 223, and a lower surface 225. A receiving channel 231 having a circular cross section is disposed in the shoulder 217 with an entry slot 235 positioned between the lower surface 225 of the shoulder 217 and the receiving channel 231. In the preferred embodiment, the entry slot 235 is disposed adjacent the lower surface 225 (as shown in FIG. 20), but it is conceivable that the entry slot 235 could be disposed adjacent the outer surface 221, the inner surface 222, or the upper surface 223.

Figure 21:
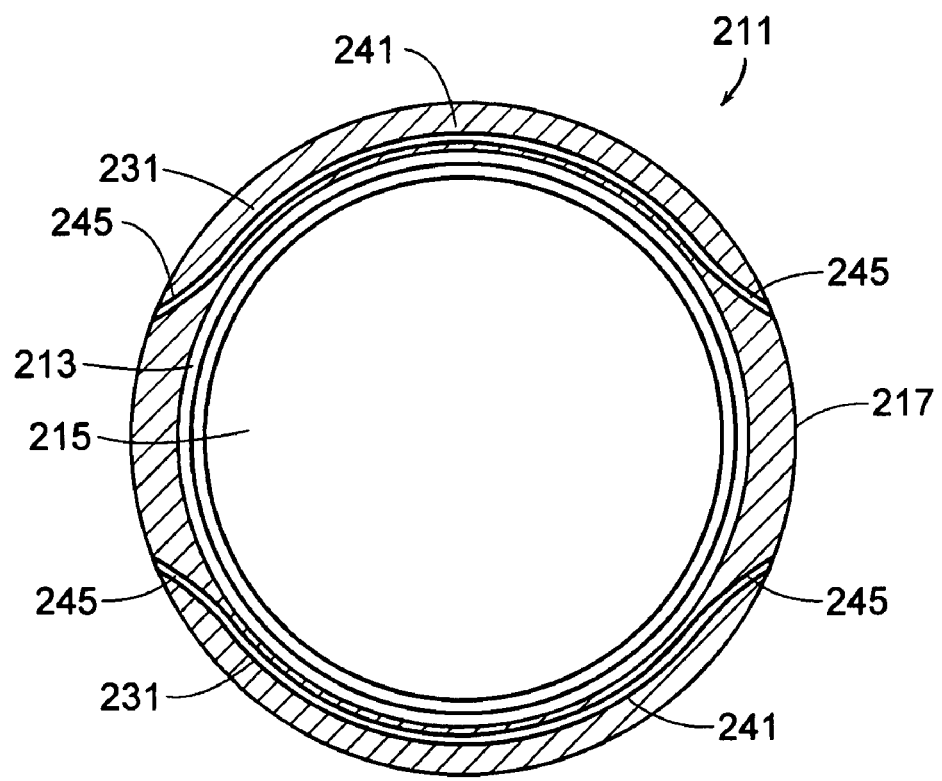
FIG. 21 depicts a cross-sectional top view of the round, flexible bakeware of FIG. 19 taken at XXI-XXI.

Referring more specifically to FIG. 21, the receiving channel 231 and entry slot 235 are not continuous around the entire perimeter of the flexible baking container 211. Instead, the receiving channel 231 includes an arcuate portion 241 that is continuous in a portion of the shoulder 217 and subtends an angle that is preferably greater than or equal to 90 degrees. An exit portion 245 is of the receiving channel 231 is located at both ends of the arcuate portion 241. Exit portion 245 turns in a direction away from wall 213 and exits the outer surface 221 of the shoulder 217. Because of the discontinuous nature of the receiving channel 231, the baking container 211 actually contains a pair of receiving channels 231 diametrically opposed on the shoulder 217 (see FIG. 21).

Figure 22:
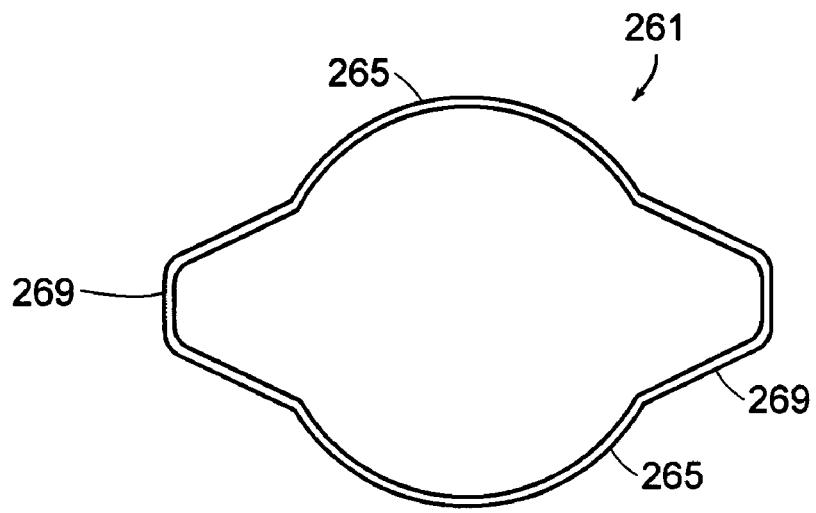
FIG. 22 illustrates a top view of a flexible bakeware carrier according to a preferred embodiment of the present invention, the carrier designed for use with the round, flexible bakeware of FIG. 18.

Referring to FIG. 22, a carrier 261 according to a preferred embodiment of the present invention is used in conjunction with flexible baking container 211. Carrier 261 is formed by a substantially rigid rod having a substantially circular cross section and made of metal or temperature-resistant plastic. Preferably, the material composition of the rod is 304 stainless steel. Carrier 261 includes a pair of central stays 265 that are joined at each end to a handle 269. Together, the pair of central stays 265 and the pair of handles 269 form a closed loop. The shape and length of the central stays 265 closely approximate those of arcuate portion 241 of the receiving channel 231. Preferably, the central stays 265 and handles 269 are welded together from stainless steel rods, but the carrier 261 could be formed using any other suitable manufacturing techniques know to those of ordinary skill in the art.

In operation, carrier 261 is received by flexible baking container 211 by inserting the centrals stays 265 and a portion of the handles 269 through the entry slot 235 of the baking container 211 and into the receiving channel 231. The flexible properties of the baking container 211 allow the shoulder 217 to deform such that the entry slot 235 is temporarily enlarged to accommodate the carrier 261 as it passes through the entry slot 235 and into the receiving channel 231. After the central stays 265 are positioned within the arcuate portions 241 of the receiving channels 231, the shoulder 217 elastically returns to its original shape. With the shoulder in a "non-deformed" shape, the entry slot 235 is again smaller than the receiving channel 231, which secures carrier 261 within the receiving channel 231.

With the carrier 261 installed in the receiving channel 231, a portion of the handle 269 is disposed within the exit portion 245 of the receiving channel, but the majority of the handle 269 is located outside the wall of the flexible baking container 211. Handle 269 enables a user of the flexible baking container 211 to easily lift and carry the baking container 211 by holding either or both handles on the portion of the handle 269 that protrudes from the baking container.

The carrier 261 provides rigidity to the flexible baking container 211 in an area around each shoulder 217 and allows a user to more easily lift and carry the baking container 211. The flexibility of the baking container 211 allows a user to easily remove the carrier 261 from the receiving channel 231 of the baking container 211. The removal of the carrier 261 could aid a user in removing food from the baking container 211, although it is not necessary to remove the carrier 261 to effectuate the release of a food product.

Figure 26:
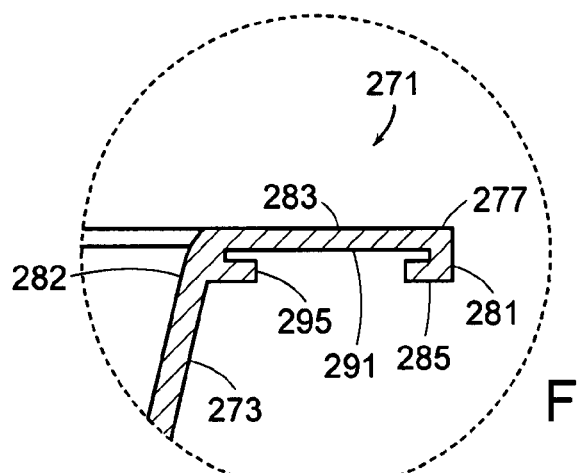
FIG. 26 illustrates an enlarged front view of the round, flexible bakeware of FIG. 25 taken at Detail XVI.

Referring to FIGS. 23-26, a round, flexible baking container 271 according to an alternative embodiment of the present invention includes a basin 272 formed by a substantially cylindrical, tapering wall 273 that is integrally joined at one end to a floor 275. A shoulder 277 is formed at an end of the wall 273 opposite floor 275, the shoulder 277 extending completely around the perimeter of the baking container 271. Shoulder 277 includes an outer surface 281, an inner surface 282, an upper surface 283, and a lower surface 285. A receiving channel 291 having a rectangular cross section is disposed in the shoulder 277 with an entry slot 295 positioned between the lower surface 285 of the shoulder 277 and the receiving channel 291. In the preferred embodiment, the entry slot 295 is disposed adjacent the lower surface 285 (as shown in FIG. 26), but it is conceivable that the entry slot 295 could be disposed adjacent the outer surface 281, the inner surface 282, or the upper surface 283.

The receiving channel 291 and entry slot 295 are preferably continuous around the entire perimeter of the flexible baking container 271. However, it is conceivable that a discontinuous receiving channel 291 and entry slot 295 could be used similar to that of baking container 211 (see FIG. 21).

Figure 23:
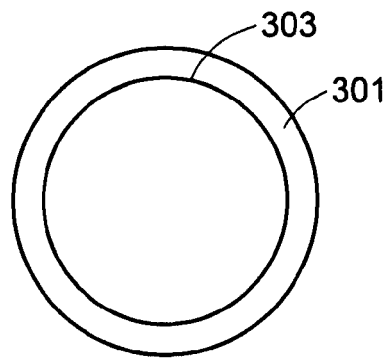
FIG. 23 depicts a top view of a flexible bakeware carrier according to an alternative embodiment of the present invention.
Figure 24:
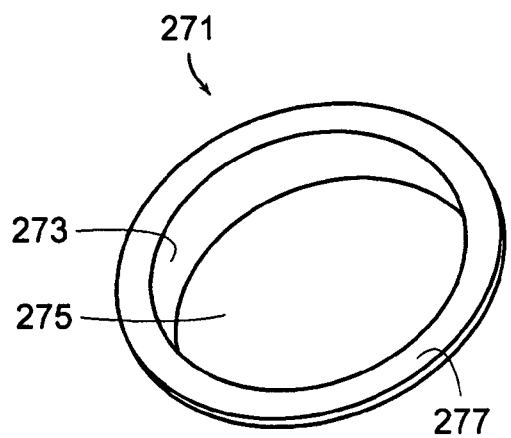
FIG. 24 illustrates a perspective view of a round, flexible bakeware according to an alternative embodiment of the present invention, the flexible bakeware designed for use with the flexible bakeware carrier of FIG. 23.
Figure 25:
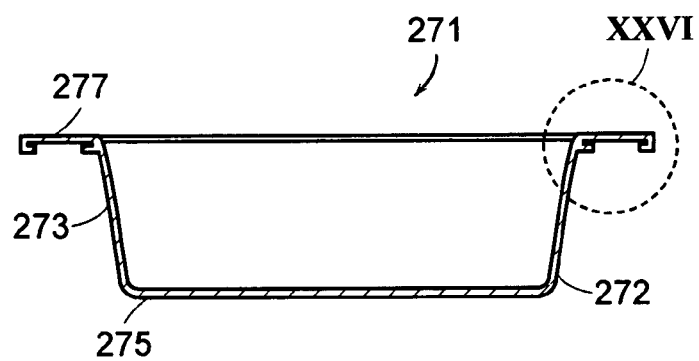
FIG. 25 depicts a cross-sectional front view of the round, flexible bakeware of FIG. 24.

Referring more specifically to FIG. 23, a carrier 301 according to an alternative embodiment of the present invention is used in conjunction with flexible baking container 271. Carrier 301 is a ring-shaped plate having a central aperture 303 and is made of metal or temperature-resistant plastic. The shape and size of carrier 301 closely approximate those of the receiving channel 291 of baking container 271.

In operation, carrier 301 is received by flexible baking container 271 by inserting the carrier 301 through the entry slot 295 of the baking container 271 and into the receiving channel 291. The flexible properties of the baking container 271 allow the shoulder 277 to bend such that the entry slot 295 is temporarily enlarged or deformed to accommodate the carrier 301 as it passes through the entry slot 295 and into the receiving channel 291. After the carrier 301 is positioned within the receiving channel 291, the shoulder 277 elastically returns to its original shape. With the shoulder 277 in a "non-deformed" shape, the entry slot 295 is again smaller than the receiving channel 291, which secures carrier 301 within the receiving channel 291.

Carrier 301 provides rigidity to the flexible baking container 271 in an area around shoulder 277 and allows a user to more easily lift and carry the baking container 271. The flexibility of the baking container 271 allows a user to easily remove the carrier 301 from the receiving channel 291 of the baking container 271. The removal of the carrier 301 could aid a user in removing food from the baking container, although it is not necessary to remove the carrier 301 to effectuate the release of a food product.

The flexible bakeware (i.e. the muffin cups 41, 51, the rectangular baking containers 111, 171, and the round baking containers 211, 271) composition of the present invention is preferably made from an addition-cured silicone material. The following table illustrates the preferred amounts and potential ranges for the flexible bakeware composition of the present invention:

| Compound | Preferred Amount (Weight %) | Range (Weight %) |
|---|---|---|
| Polydimethylvinylsiloxane/Silica | 60.88 | 40-70 |
| High Vinyl Silicone Gum | 1.1 | 0.5-10 |
| Ground Quartz (filler) | 28.5 | 5-50 |
| Polytetrafluoroethylene | 6.0 | 0.1-15 |
| Black Iron Oxide (pigment) | 1.1 | 0.1-5 |
| Zinc Stearate (internal mold release) | 0.14 | 0.1-5 |
| Silicon Hydride | 1.7 | 0.1-25 |
| Chloro Platanic Acid (cross-linking agent) | 0.57 | 0.1-5 |
| Ethynl Cyclohexanol (inhibitor) | 0.01 | 0.05-5 |

The flexible bakeware compound preferably contains 0.1 to 15 weight percent of polytetrafluoroethylene (PTFE). Testing of silicone bakeware with these amounts of PTFE has revealed superior release properties compared to silicone bakeware without PTFE. Several different compounds were tested by baking foods in the bakeware and then determining the amount of food residue remaining in the bakeware following the removal of the baked goods. Clearly, less food residue in the bakeware indicates better release properties. Silicone bakeware without PTFE required the use of a non-stick spray or flour to eliminate food residue following baking. Although silicone bakeware having PTFE ranging from 0.1 to 15 weight percent exhibited improved release properties without the use of a non-stick spray or flour, the optimum composition was determined to include six (6) weight percent PTFE.

The preferred particle size of PTFE used with the present invention is approximately 6 μm (i.e. microns), with a maximum particle size of 25 μm. While larger particle sizes of PTFE can also impart improved release properties to the bakeware, the plasticity of the resulting compound is sometimes increased to an extent that extrusion and molding of the compound is difficult or impossible. An example of PTFE commonly used in preparing the flexible bakeware compound of the present invention is Polymist F-5A, which can be obtained from Ausimont USA. Polymist F-5A contains particles of a relatively small size, typically at or below 6 μm.

The compounding of PTFE in the formulation of the present invention results in the migration of PTFE to the surface of the flexible bakeware. The presence of the PTFE at or near the surface at least partially results in the superior release properties of the bakeware. Another advantage provided by the PTFE is that it does not impart an odor or taste to food products baked in the bakeware.

The flexible bakeware compound is preferably combined with a cross-linking agent to insure that the bonds of the compound properly form. The cross linking agent may be a catalyst, such as platinum, or a curing agent such as peroxide. A platinum catalyst (i.e. chloro platanic acid) is preferably used in conjunction with silicon hydride to insure that the proper bonds form between the platinum and the silicone compound. If a curing agent, such as peroxide, were used, silicone hydride would not be required. However, peroxide is not preferred because it generally imparts an unpleasant odor and smell to foods baked in the bakeware. Other catalysts, including but not limited to cesium, palladium, rhodium, iron, cobalt, nickel, rubidium, osmium, or iridium, could be used in place of platinum. However, these substances are generally not favored because they are either more expensive (e.g. palladium) or have problems associated with contamination (e.g. iron).

The preferred filler for the bakeware compound is ground quartz in an amount of about 28.5 weight percent; however, filler in an amount of 5-50 weight percent could be used. Alternative fillers include silica, calcium, or any other mineral.

The bakeware compound preferably contains black iron oxide in an amount of 1.1 weight percent, which gives the finished bakeware a black color. Depending on the desired color for the bakeware, many different pigments could be used, and the amount of pigment used could also be varied to alter the color. Preferably, the weight range of the pigment is between 0.1 and 5 weight percent.

High vinyl silicone gum is preferably added to the compound in an amount of about 1.1 weight percent; however, the compound could include high vinyl silicone gum in any amount between about 0.5 and 10 weight percent. The vinyl component of high vinyl silicone gum includes pendant vinyl in an amount of 8-20 weight percent of the high vinyl silicone gum, with a preferred amount of 14 weight percent.

The novel composition of the present invention preferably has a specific gravity of about 1.12 to 1.64.

Each item of flexible bakeware is preferably injection, compression, or transfer molded. To further enhance the release properties of the bakeware, a molding tool having a finish between A1 and B2 is used to form the bakeware, with the preferred finish being A2. Molding finishes of this type are known standards within the molding industry.

Figure 27:
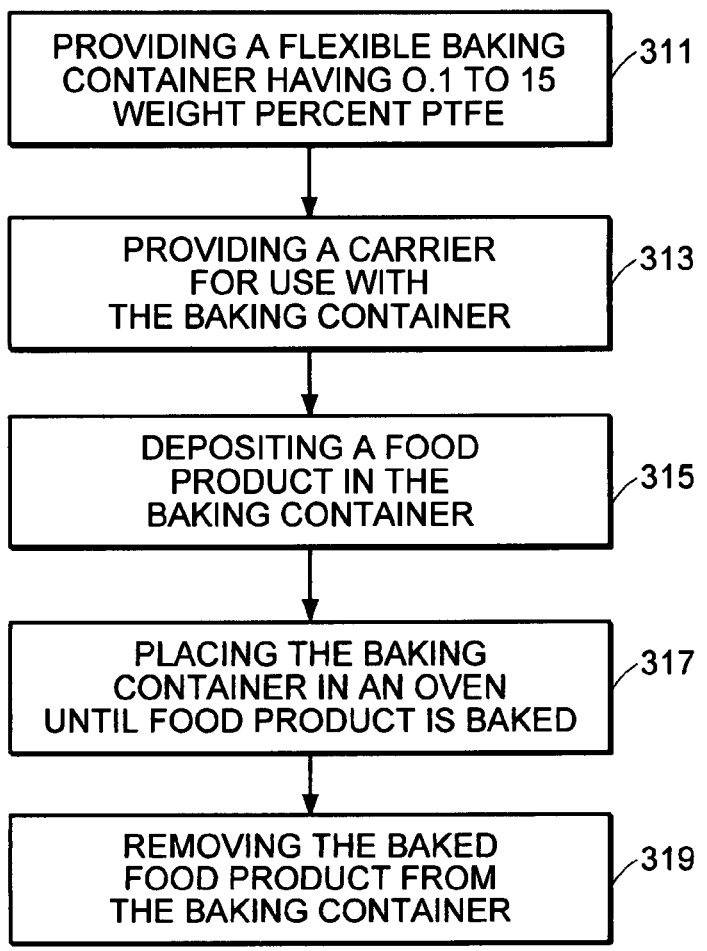
FIG. 27 depicts a flow chart of a method of baking a food product according to the present invention.

Referring to FIG. 27, a method for baking a food product 309 according to the present invention includes, in step 311, providing a flexible baking container formed from an addition-cured silicone polymer having polytetrafluoroethylene in amount of about 0.1 to 15 weight percent. In step 313 a carrier adapted to be received by a receiving channel in the flexible baking container is provided. A user deposits a food product in the baking container at step 315, and the baking container is placed in an oven at a baking temperature for a predetermined time until the food product is baked at step 317. The baked food product is removed from the baking container at step 319.

Several variations of the method illustrated in FIG. 27 are possible. First, the use of the carrier is not required if the baking container is made from the novel flexible bakeware compound of the present invention. Alternatively, the carrier may be used with a traditional flexible baking container instead of one incorporating the flexible bakeware compound. In either situation, all of the features and advantages explained previously in connection with the flexible bakeware compound and carrier are applicable to the bakeware used with the method.

It should be apparent that although the flexible bakeware of the present invention has been described in terms of a round muffin cup, a rectangular baking container, and a round baking container, any size or shape of flexible bakeware could be included within the scope of the present invention. Similarly, the carrier could be provided in many different shapes or sizes, and may include single or multiple handles that extend outward from the bakeware. Alternatively, the carrier may have no handles at all. The receiving channel shapes and sizes that are formed in each piece of flexible bakeware could also vary as long as the bakeware is securely attached to the carrier member and will not become disengaged from the carrier member while the bakeware is being transported or carried.

It is also important to note that while the flexible bakeware has been described as having an entry slot communicable with the receiving channel for allowing the carrier to be placed in the receiving channel, the entry slot could be omitted. Without an entry slot, the carrier would preferably be integrally molded into the shoulder of the bakeware. The carrier would not be removable, but the carrier would still be carried by a receiving channel that was formed around the carrier during the molding process.

The primary advantage provided by the carrier is that it allows a user of flexible bakeware to more easily lift and transport the bakeware while baking. By providing rigidity around the perimeter of the flexible bakeware, it is no longer necessary to support the flexible from underneath such as with a cooking sheet or tray. Another advantage is provided by the handle portions of the carrier. The handle portions extend outward from the perimeter of the flexible bakeware and provide a larger gripping surface for a user carrying the bakeware. Still another advantage of the carrier system is that it is easily and inexpensively manufactured. Flexible bakeware can be easily manufactured with a receiving channel in a shoulder that surrounds the perimeter of the bakeware. The carrier can then be made to fit within the receiving channel to provide the needed rigidity to a portion of the bakeware.

The novel composition for flexible bakeware presented herein is preferably used in conjunction with a carrier to provide the added benefits of being able to more easily lift and carry the bakeware. However, the advantages provided by the novel composition are independent of those provided by the carrier. As a result of these independent, yet valuable, results, the novel composition may be used without the carrier in a manner similar to that of traditional flexible bakeware. It is also important to note that use of the composition described herein for flexible bakeware is not limited to use with bakeware having a particular size or shape.

The primary advantage provided by the bakeware composition of the present invention is that it enables improved release of food products being baked in the bakeware. The composition was obtained and refined by extensive testing and experimentation. Testing revealed that traditional flexible bakeware suffers food release problems unless pre-lubricated with either cooking spray, cooking oil, or flour. The addition of PTFE to an addition-cured silicone compound allows the manufacture of flexible bakeware that releases baked food without the need for pre-lubrication.

The composition described herein is not limited to flexible bakeware, but could be used with any product requiring the advantages presented by the compound. In addition to the "release" or "non-stick" advantage described previously, the compound provides excellent thermal insulating properties. The compound also has exceptional stability when exposed to cold and heat. The materials used with the compound are all food grade materials, so the product can be placed in contact with food. Finally, since the compound is silicone based, the compound provides excellent resistance to ultraviolet (UV) light. Some of the potential applications for the compound, outside of the flexible bakeware application, include but are not limited to spatulas and other cooking utensils, jello and confectionary molds, and ice cube trays. Other uses include cookware handles that are essentially insulative sleeves that slip over the hot handle of an item of cookware. The compound could be made into pot holders for removing hot items from an oven, or flat baking mats that can be placed on a cooking tray for baking cookies or other food products. Still another use could be sealing materials for appliance doors or windows, or any other sealing application where a flexible compound with good release properties is needed.

It should be apparent from the foregoing that an invention having significant advantages has been provided. While the invention is shown in only a few of its forms, it is not just limited but is susceptible to various changes and modifications without departing from the spirit thereof.

We claim:

1. A flexible bakeware compound comprising:
   a methyl vinyl silicone polymer from about 40 to 70 weight percent;
   a filler from about 5 to 50 weight percent;
   polytetrafluoroethylene from about 0.1 to 15 weight percent;
   a cross-linking agent from about 0.1 to 5 weight percent; and
   high vinyl silicone gum from about 0.5 to 10 weight percent, wherein the high vinyl silicone gum includes a vinyl component having pendant vinyl in an amount of 8-20 weight percent of the high vinyl silicone gum.

2. A flexible bakeware compound according to claim 1, wherein the cross-linking agent is a platinum catalyst.

3. A flexible bakeware compound according to claim 1, wherein the methyl vinyl silicone polymer is polydimethylvinylsiloxane.

4. A flexible bakeware compound according to claim 1, wherein the filler is ground quartz.

5. A flexible bakeware compound according to claim 1, wherein the cross-linking agent is chloro platanic acid.

6. A flexible bakeware compound according to claim 1, wherein the polytetrafluoroethylene is present in an amount of about 6 percent.

7. A flexible bakeware compound according to claim 1 further comprising:
   silicone hydride from about 0.1 to 25 weight percent; and
   wherein the cross-linking agent is chloro platanic acid.

8. A flexible bakeware compound according to claim 1, wherein the methyl vinyl silicone polymer is polydimethylvinylsiloxane, wherein the filler is ground quartz, and wherein the cross-linking agent is chloro platanic acid.

9. A flexible bakeware compound according to claim 1 further comprising:
   a pigment from about 0.1 to 5 weight percent;
   zinc stearate from about 0.1 to 5 weight percent;
   silicone hydride from about 0.1-25 weight percent; and
   ethynl cyclohexanol from about 0.05 to 5 weight percent.

10. A flexible bakeware compound comprising:
    a methyl vinyl silicone polymer of about 61 weight percent;
    a filler of about 28.5 weight percent;
    polytetrafluoroethylene of about 6 weight percent;
    a cross-linking agent of about 0.57 weight percent; and
    high vinyl silicone gum from about 1.1 weight percent, wherein the high vinyl silicone gum includes a vinyl component having pendant vinyl in an amount of 8-20 weight percent of the high vinyl silicone gum.

11. A flexible bakeware compound according to claim 10, wherein the methyl vinyl silicone polymer is polydimethylvinylsiloxane.

12. A flexible bakeware compound according to claim 10, wherein the filler is ground quartz.

13. A flexible bakeware compound according to claim 10, wherein the cross-linking agent is chloro platanic acid.

14. A flexible bakeware compound according to claim 10, wherein the methyl vinyl silicone polymer is polydimethylvinylsiloxane, wherein the filler is ground quartz, and wherein the cross-linking agent is chloro platanic acid.

15. A flexible bakeware compound according to claim 10 further comprising:
    a pigment from about 1.1 weight percent;
    zinc stearate from about 0.14 weight percent;
    silicone hydride from about 1.7 weight percent; and
    ethynl cyclohexanol from about 0.01 weight percent.

* * * * *